Oct. 17, 1944.    S. H. McALLISTER ET AL    2,360,699
CATALYTIC CONVERSION PROCESS
Filed July 25, 1941
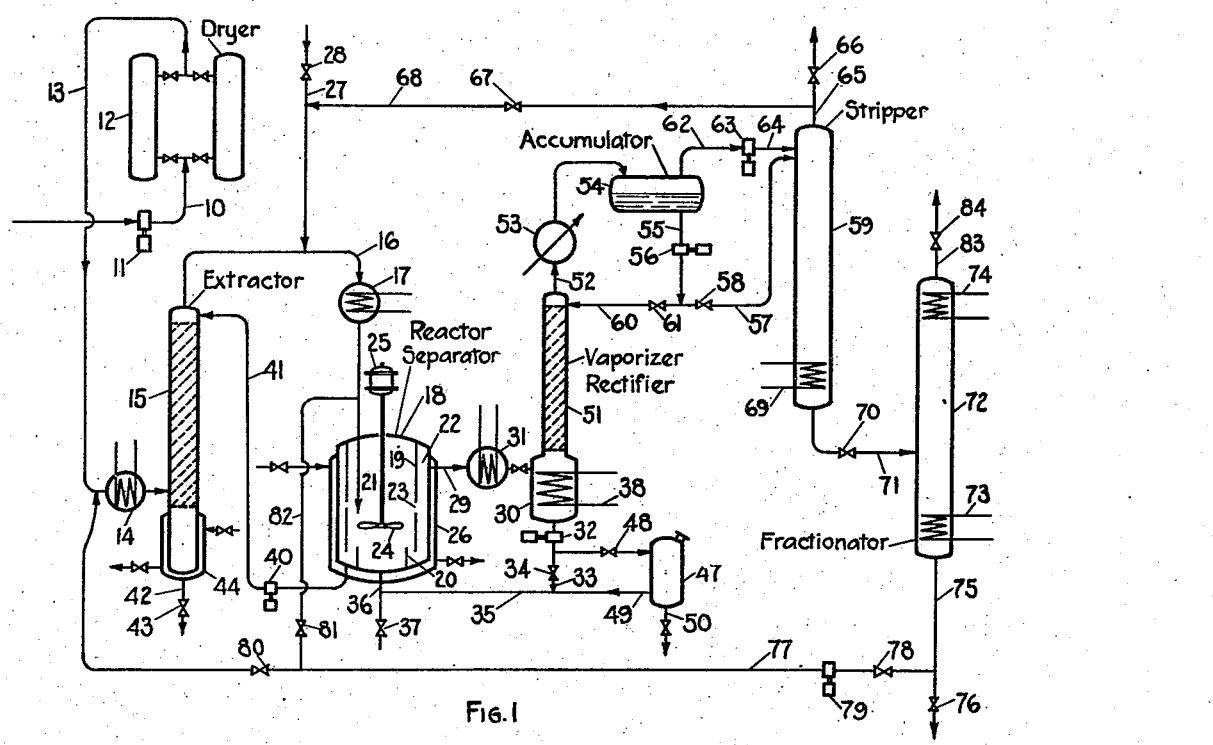
Fig. I
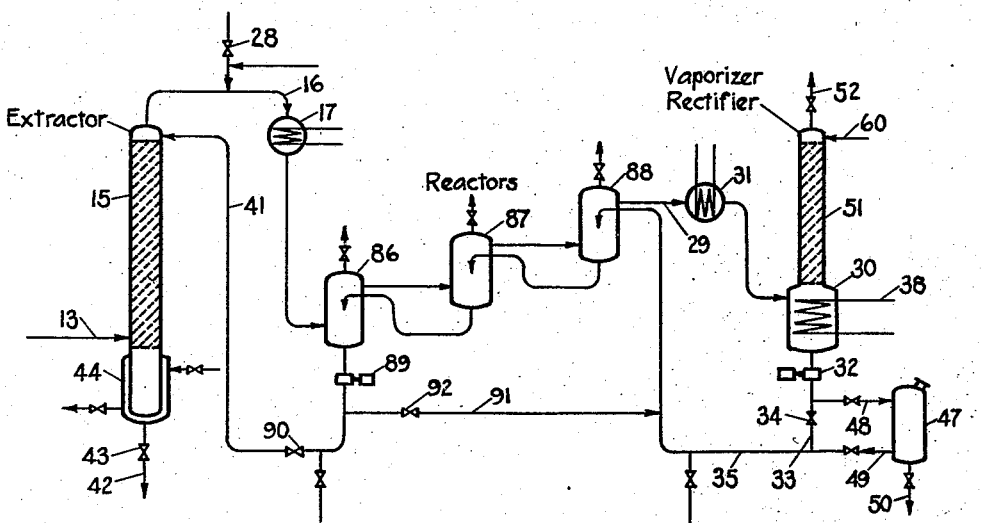
Fig. II
Inventors: Sumner H. McAllister
John Anderson
William E. Ross
By their Attorney Patented Oct. 17, 1944

2,360,699

UNITED STATES PATENT OFFICE 2,360,699

CATALYTIC CONVERSION PROCESS

Sumner H. McAllister, Lafayette, and John Anderson and William E. Ross, Berkeley, Calif., assignors to Shell Development Company, San Francisco, Calif., a corporation of Delaware Application July 25, 1941, Serial No. 404,056

13 Claims. (Cl. 260—683.5)

The present invention relates to an improved process and apparatus for effecting catalytic conversions in the liquid phase with fluid catalysts. A particular aspect of the invention relates to the execution of catalytic conversions with catalysts of the molten-salt type, such in particular as molten-salt mixtures comprising metal salts of the Friedel-Crafts type. A still more particular aspect of the invention relates to the liquid phase isomerization of saturated hydrocarbons.

In the majority of processes involving catalytic conversions, the catalyst is employed in a solid state in the form of fragments, pellets, or the like. The use of solid catalysts is quite satisfactory in many cases, but has certain disadvantages such as the difficulty of moving solid catalysts in the reaction zone, poor heat transfer conditions, difficulty of properly contacting catalyst and reactants, the need for large volumes of catalysts, etc., which seriously detract from its suitability, particularly when employing metal halide catalysts. These disadvantages can often be diminished or eliminated by employing the catalyst in the liquid state. This is accomplished in any one of several ways, depending upon the particular catalyst. A common method is to employ the catalyst in the molten state.

It is often impractical, if not impossible, to employ the active catalyst per se in the molten state and a multicomponent catalyst containing one or more modifying agents must therefore be used. Thus, for example, in the case of molten-salt catalysts a plurality of salts are generally combined. By the use of suitable combinations of salts, fusible mixtures which have excellent activity and may be melted to free-flowing liquids at relatively low temperatures may be prepared. Thus, for example, Friedel-Crafts type catalysts, such in particular as aluminum chloride, are only fusible in their pure state at relatively high temperatures, and at such temperatures they act primarily to cause degradation and sludge formation. On the other hand, if their salts are combined with other salts such as the halides of Li, Na, K, Cu, Mg, Zn, Cd, Sn, Pb, As, Sb, Bi, Cr, Mo, Fe, Co, and Ni, excellent multicomponent catalysts which may be used in the form of mobile liquids at temperatures even below 100° C. may be produced. In certain processes, such as isomerization and alkylation of hydrocarbons, a low melting point of the catalyst is important since the reaction equilibrium becomes progressively less favorable as the reaction temperature is increased, and it is therefore desirable to effect the conversion at relatively low temperatures.

The melting point of these multicomponent catalysts is dependent upon their composition. In general, the composition is quite critical and if the catalyst is allowed to deviate from the desired composition the melting point is considerably increased. In the usual operation of processes with such catalysts by prior known methods, it is therefore necessary to operate at a temperature sufficiently above the freezing point of the catalyst to allow for any changes in melting point due to changes in catalyst composition during the process. Changes in the freezing points of the catalysts caused by variations of catalyst composition are not only detrimental in requiring the use of somewhat higher reaction temperatures, but in their effect upon the degree of efficiency with which the catalysts and reactants may be contacted. In all such processes, the efficiency of contact of the reactants and the catalyst is of prime importance since it directly affects the conversion and production capacity. When such low-melting multicomponent catalysts change appreciably in composition during use, the viscosity of the melt increases, and this usually causes a considerable falling-off of the conversion or production capacity.

These various molten catalysts, although highly desirable in many respects, present certain disadvantages when used in the hitherto proposed processes which have prevented their widespread use. One of these disadvantages has been the excessive cost and difficulty of recovering the catalyst after it is partly or completely spent. This is due to the fact that it is rarely practical to discard the spent catalyst and that the recovery of the valuable components therefrom usually requires withdrawing the molten mixture to a separate recovery unit wherein carbonaceous material is burned out. In most cases it is necessary to follow this operation by a distillation of the catalyst components from the nonvolatile material in the catalyst. Aluminum chloride-containing catalysts, for example, when spent, will comprise non-volatile alumina formed by the degradation of aluminum chloride. This requires a separate treatment, usually under vacuum. In the hitherto proposed processes, using catalysts of this type, these disadvantages have been greatly aggravated when treating hydrocarbons or other organic materials with catalysts of the Friedel-Crafts type, due to the fact that these catalysts are particularly prone to form sludges. The sludges, which are presumably complex compounds comprising side reaction products and Friedel-Crafts halides, quickly become viscous and sticky. Since their accumulation in the reaction zone to any substantial extent causes mechanical difficulties such as pumping problems, line plugging, etc., it has been necessary to withdraw the catalyst from the system long before it is completely spent and subject it to the regeneration treatment.

The object of the present invention is to provide an improved process and apparatus whereby liquid phase catalytic conversions with these fluid catalysts can be effected in a more practical and economical manner, while substantially obviating inherent difficulties of the prior art processes. The process of the present invention not only substantially overcomes these known disadvantages but also allows certain other distinct advantages to be realized.

We have observed that the sludges formed in such processes, notwithstanding the fact that they contain carbonaceous matter, are substantially insoluble in the reactant feed and are, in fact, considerably more insoluble than many of the salt components of the catalysts. We have also observed that in multicomponent catalysts, even though the solubilities of the individual components may be small, they are not equal and, as a result, an appreciable change in catalyst composition can be caused by extraction of the more soluble component or components by liquid reactants. For example, in the case of molten catalysts comprising an excess of $AlCl_3$ dissolved in LiCl, NaCl, KCl, etc., the $AlCl_3$ will be extracted selectively from the mixture and, in the case of molten catalysts comprising $AlCl_3$ dissolved in $SbCl_3$, $SnCl_4$, $BiCl_3$, $AsCl_3$, etc., these latter salts are removed at a much faster rate than the $AlCl_3$.

The difficulties heretofore encountered in recovering the spent catalyst are avoided according to the process of the present invention by continuously subjecting a portion of the catalyst to a continuous treatment within the system whereby valuable components of the catalyst are separated from the sludge by an extraction process and continuously returned to the reaction zone. The tendency of the more soluble component or components of the catalyst to be extracted from the catalyst within the reaction zone by the liquid reactants is counteracted in the present process by at least partly saturating the feed to the reaction zone with the more soluble catalyst component or components, and in the preferred embodiment of the invention the soluble component of the catalyst is supplied to the feed by extraction of spent or partly spent catalyst withdrawn from the reaction zone.

The invention is applicable to a wide variety of catalytic processes wherein materials are contacted with fluid catalysts of the molten salt type. However, for the purpose of setting forth the invention more clearly, it will be described in detail herein in its application to a specific hydrocarbon conversion, namely the isomerization of saturated hydrocarbons. The description will be made with reference to the accompanying drawing forming part of this specification and wherein Figure I shows a more or less diagrammatic elevational section of a form of apparatus suitable for carrying out the invention, and Figure II shows a more or less diagrammatic elevational section of a modification of the apparatus shown in Figure I.

Referring to Figure I of the drawing, a saturated hydrocarbon, for example butane, from any suitable source, is forced by means of pump 11 through line 10 into a drying zone. The drying zone may consist of one or more chambers 12 containing a suitable dehydrating material such as, for example, calcium chloride, adsorptive alumina, or the like. From dryer 12 the dried butane stream is passed through line 13, provided with preheater 14, to an intermediate part of an extraction zone. The extraction zone may consist of a column 15 provided with suitable packing material, baffles, or the like. Within extraction zone 15, butane is contacted with catalyst as described more fully below. Butane, comprising recovered catalyst components, is passed from extraction column 15 through line 16 and heater 17 to a reaction zone.

In a preferred embodiment of the invention, the reaction zone consists of a reaction chamber 18 wherein a cylindrical partition 19 extends downward from the top of the chamber to a short distance from the bottom thereof. A second cylindrical partition 20 of smaller diameter than partition 19 and concentric therewith extends upward from the bottom of chamber 18 for a short distance beyond the lower extremity of partition 19. Partitions 19 and 20 thus define a mixing zone 21 surrounded by an annular space 22, within the single reaction chamber 18. A plurality of openings 23 are provided in intermediate part of partition 19. A stirrer 24, actuated by any suitable driving means such as, for example, a motor 25, is positioned in mixing zone 21 of reaction chamber 18. Reaction chamber 18 is preferably provided with a jacket 26 equipped with valved inlet and outlet for the passage of a heating medium such as, for example, steam, hot oil, etc., therethrough.

Within mixing zone 21 of reaction chamber 18, butane is brought into intimate contact with a suitable fluid isomerization catalyst to effect the isomerization of butane. A wide variety of suitable isomerization catalysts comprising highly active molten salt catalyst mixtures may suitably be used. A very suitable catalyst may comprise, for example, a molten mixture of antimony chloride and aluminum chloride in the approximate proportions of 76 to 97 mol per cent $SbCl_3$ and 24 to 3 mol per cent $AlCl_3$. The temperature to be maintained within the reaction chamber 18 may range from the minimum temperature at which the catalyst may be maintained in the fluid state up to approximately 200° C. A particularly effective temperature may comprise, for example, a temperature in the range of from about 60° C. to about 120° C., depending upon the particular catalyst used. The pressure to be maintained within reaction chamber 18 may vary from the minimum pressure required to maintain the butane in the liquid phase to any desired super-atmospheric pressure. Pressures in the range of from 125 to 500 lbs. gauge, for example, are quite suitable.

The isomerization, when employing catalysts of the above type, is preferably effected in the presence of a hydrogen halide such as hydrogen chloride. This is preferably introduced with the hydrocarbon feed. Hydrogen chloride is therefore drawn from any outside source through line 27 provided with valve 28 leading into line 16. The amount of hydrogen chloride introduced into the system may vary widely in accordance with the nature of the charge, the catalyst composition, and the operating conditions. In such cases where it is not desired to recover and recycle the hydrogen chloride, minimum quantities such as from about 0.3% to 5% of the hydrocarbon feed may be employed. When the hydrogen chloride is recycled, however, much larger quantities, for instance up to 25%, of the butane charge may be economically employed. If desired, a limited amount of hydrogen may be introduced with the hydrogen chloride to repress cracking or other undesirable side reactions.

By means of stirrer 24, butane is intimately mixed with the fluid catalyst and the mixture is caused to circulate through opening 23 into the annular space 22 of the reaction chamber 18, and from the lower part thereof back into mixing zone 21. Due to the substantial absence of agitation in the upper part of the annular space 22, the hydrocarbon phase of the hydrocarbon-catalyst mixture concentrates therein. Spent catalyst, which is substantially insoluble in the hydrocarbon phase, concentrates in the lower part of annular space 22.

It is to be understood that the invention is not limited by the degree of separation of hydrocarbons from catalyst effected in annular space 22 of reaction chamber 18. The extent of the separation will vary widely with operating conditions, the nature of the material treated, and the particular catalyst used. It may be possible and desirable at times to effect substantially complete separation of the reaction products from the catalyst in this zone. In a preferred embodiment of the invention, however, reaction products comprising admixed catalyst is continuously withdrawn from the upper part of annular space 22 of reaction chamber 18, through line 29, and passed into a vaporizer 30 provided with suitable heating means such as a closed coil 38. A heater 31 is positioned in line 29. Within vaporizer 30, hydrocarbons comprising isobutane and unreacted normal butane are separated as a vapor fraction from liquid catalyst. In this embodiment of the invention, vaporizer 30 functions not merely as a vaporizer but as a catalyst accumulator, and a supply of fluid catalyst is maintained therein. Liquid catalyst is withdrawn from vaporizer 30 and forced by means of pump 32 through line 33 provided with valve 34, line 35, and line 36 provided with valve 37, to the lower part of reaction chamber 18. Maintenance of desired reaction temperature conditions within reaction chamber 18 is effected by means of heater 17 and heating coil 38. Additional heating means, not shown in the drawing, may suitably be provided within reaction chamber 18.

The reactor described above, preferably used in the process of the invention, is found to be exceedingly efficient in bringing about the intimate contact of catalyst and reactants while permitting the withdrawal therefrom of sludge-free liquid comprising reaction products and catalyst. The absence of the sludge in the liquid fraction comprising reaction products and catalyst drawn from the reactor not only eliminates, to at least a substantial degree, the difficulties often encountered heretofore in processes wherein molten-salt-type catalysts are handled outside of the reaction zone, but prevents contamination of the catalyst within vaporizer-accumulator 30. The continuous flow of catalyst from reaction chamber 18 through vaporizer 30 insures the constant, substantially complete separation of organic material from the catalyst. It has been found that this greatly contributes to the prolonged effective life of the catalyst melt. A plurality of reactors may suitably be used and it is not to be considered beyond the scope of the invention to substitute a separate chamber removed from the reactor for the annular space 22 of the preferred reactor. The use of the preferred reactor described above, however, avoids the difficulty of maintaining such a separate chamber at the proper temperature, eliminates the need for passing catalyst melt in lines from the reactor to and from such a separate chamber, and contributes to a greater heat economy within the system. These improvements of the process of the invention materially aid in obtaining prolonged operation with far greater ease than is attainable in processes used heretofore, wherein fluid catalysts of the molten-salt type are used.

The exceptional suitability of the mixer-type reactor for the isomerization of butane with an $SbCl_3$-$AlCl_3$ catalyst melt is shown by the following example:

Butane was isomerized in the liquid phase with a catalyst melt consisting of 92.5% of $SbCl_3$ and 7.5% $AlCl_3$ at a temperature of 80° C. and a pressure of approximately 400 lbs. gauge, in a mixer-type reactor. Butane was continuously charged to the reactor at a rate to maintain a catalyst to hydrocarbon ratio of 1:1 and a contact time of 13 to 15 minutes. Hydrogen chloride in the amount of 4% by weight was added to the butane charge. Over a period of 144 hours of continuous operation, an average conversion to isobutane of 41% was obtained; that is, an average of 41 mol per cent of isobutane was obtained in the total hydrocarbon reaction products.

It is seen from the above figures that excellent and sustained yields may be obtained over a prolonged period of operation with a short period of contact and without recourse to recycling of normal butane.

Spent or partly spent catalyst comprising sludge is withdrawn from the lower part of the annular space 22 of reaction chamber 18 and forced by means of pump 40 through line 41 into the upper part of column 15, wherein it is contacted with an upward flow of hydrocarbon feed. The rate at which catalyst is withdrawn from reaction chamber 18 and passed to column 15 will vary with operating conditions. It is, however, preferred to effect this withdrawal at a rate sufficiently high to prevent the accumulation of sludge within reaction chamber 18. During the downward course of the spent or partly-spent catalyst through column 15, at least a substantial part of the more soluble salt components contained therein are dissolved in the hydrocarbon feed. The sludge, comprising organic complexes of the Friedel-Crafts catalysts, which is contained in the spent catalyst, is substantially insoluble in the hydrocarbon feed which contributed to its formation and accumulates in the lower part of column 15 whence it is withdrawn. The hydrocarbon charge to the system is preferably preheated to a temperature favorable to the extraction operation. This temperature will vary with the nature of the material being treated and the particular catalyst used. In the present illustrative description of the invention in its application to the isomerization of butane, the butane charge is preferably heated to a suitably elevated temperature, for example in the approximate range of 50° C. to 125° C. and preferably 50° C. to 100° C. When operating with a higher temperature in scrubber 15 than in reaction chamber 18, heater 17 may be replaced by suitable cooling means comprising, for example, a heat exchanger, enabling the reduction of the temperature of the hydrocarbon stream in line 16 to the desired reaction temperature. The SbCl₃-AlCl₃ catalyst of the above-described range of composition is found to possess an appreciable degree of solubility in normal butane in this temperature range. Thus, at 80° C. the solubility of this catalyst in normal butane is found to be in the order of about 7.2% to 7.5% by weight, and the dissolved catalyst material comprises approximately 97% to 99.5% of SbCl₃, the remainder of the dissolved material being AlCl₃. The sludge, comprising organic aluminum chloride complex compounds present in the spent or partly-spent catalyst is substantially insoluble in the butane and settles to the lower part of column 15, whence it is withdrawn through line 42, controlled by valve 43, and eliminated from the system. The lower part of column 15 is provided with heating means such as, for example, a heating jacket 44 provided with inlet and outlet means for a heating medium such as steam or hot oil to maintain the spent catalyst residue in the fluid state. By judicious control of conditions within column 15, substantially all of the SbCl₃ may be extracted by the incoming butane feed from the spent catalyst in a substantially pure state and conveyed in the butane stream through line 16 into reaction chamber 18. The efficiency of the catalyst recovery step of the invention is illustrated by the following examples:

101.5 grams of spent catalyst obtained in the isomerization of butane with a catalyst melt consisting of 92.5% of SbCl₃ and 7.5% of AlCl₃ was extracted with 5 portions of normal butane totaling 2.14 kg., at a temperature of 80° C. 83.1 grams of sludge-free solid material, 99% of which was SbCl₃ and the remainder predominantly AlCl₃, was extracted from the spent catalyst.

624 grams of spent catalyst obtained in the isomerization of butane with a catalyst melt consisting of 92.5% of SbCl₃ and 7.5% of AlCl₃ was extracted at a temperature of 80° C. with 15.5 kg. of normal butane in a continuous operation. The butane was charged to the extractor at the rate of 1000 grams per hour. 604 grams of sludge-free solid material was extracted from the spent catalyst. More than 99% of the extracted material was found to be SbCl₃, the remainder being predominantly AlCl₃. The residue consisted essentially of carbonaceous complex compounds and contained only approximately 0.4 gram of Sb.

It is to be noted from these examples that the catalyst components are recovered free of sludge and that the carbon content of the spent catalyst is found in the residual material. It is seen therefrom that but very little of the AlCl₃-hydrocarbon complex in the spent catalyst, which renders the use of molten salt catalysts so difficult in the processes used heretofore, remains within the system in the process of the invention. This continuous removal of the AlCl₃-hydrocarbon complex from the system not only assures a substantial increase in catalyst life and maintenance of high catalyst activity, but greatly facilitates the handling of the molten catalyst within the system.

Since the catalytic activity and minimum temperature at which the SbCl₃-AlCl₃ catalyst can be maintained in the fluid state depend upon the catalyst composition, and since SbCl₃ is the predominating component of the catalyst, its continuous substantially complete recovery and return to the reaction zone greatly facilitates the maintenance of optimum reaction conditions. Antimony chloride, furthermore, is a relatively costly material and therefore the practical and efficient method for its recovery within the system greatly contributes to the lower cost at which isomerization may be effected by the present process.

Sufficient catalyst flowing through line 33 is periodically bypassed through a drum 47 containing aluminum chloride, by means of valved lines 48 and 49 to replace the aluminum chloride used up during the process in the formation of sludge. The fluid catalyst may be drained from the system through valved lines 50 and 36 and passed to suitable catalyst storage means not shown in the drawing, whence it may again be sent into the system through line 36.

Although antimony chloride has but a slight vapor pressure at the reaction temperature, some will nevertheless tend to pass along with the reaction products leaving vaporizer 30. In order to prevent the loss of this material and avoid the difficulties which result from its presence in the remainder of the system, rectifier 51 packed with suitable packing material is positioned above vaporizer 30. Sufficient liquid reflux is introduced into the upper part of the rectifier to carry any entrained antimony chloride back to the reactor in solution. Reaction products comprising isobutane, normal butane and hydrogen chloride pass from rectifier 51 through line 52 and cooler 53 into accumulator 54. In passing through cooler 53, the reaction products are cooled to a temperature sufficiently low to effect the condensation of butanes. Although but a single cooler is shown in the drawing, more than one cooling system and, if desired, a refrigerator system may be used to effect the desired cooling of the reaction products. Liquid is drawn from accumulator 54 through line 55 and forced by means of pump 56 through line 57, provided with valve 58, to a stripping column 59. Part of the liquid drawn from accumulator 54 is forced through line 60 provided with valve 61 as reflux, to the top of rectifier 51. Cooling means not shown in the drawing may be provided to further cool the reflux passing to rectifier 51. Vapors and gases comprising hydrogen chloride are drawn from accumulator 54 through line 62 to compressor 63. From the high pressure side of compressor 63, the compressed stream is passed through line 64 into stripping column 59. Within stripping column 59 a gaseous fraction comprising hydrogen chloride is separated from a liquid fraction comprising isobutane and unreacted butane. A high pressure, for example in excess of about 300 lbs., is maintained within column 59 to effect the desired separation. The gaseous fraction comprising hydrogen chloride is eliminated from the top of column 59 through line 65 provided with valve 66, and is recycled at least in part through line 68 provided with valve 67, to line 27. Suitable means such as, for example, a reboiler or heating coil 69 is provided in the bottom of column 59 to effect the desired separation. Liquid comprising isobutane and unreacted butane is withdrawn from the bottom of column 59 and passed through line 71 provided with valve 70, into a fractionator 72. Fractionator 72 is provided with suitable heating means such as, for example, a reboiler or a heating coil 73 in the bottom part thereof, and suitable cooling means such as, for example, a cooling coil 74 in the upper part thereof. Within fractionator 72 a vapor fraction comprising isobutane is separated from a liquid fraction comprising normal butane. Liquid comprising normal butane is withdrawn from fractionator 72 through line 75 provided with valve 76, and eliminated from the system. A part or all of the butane drawn from fractionator 72 through line 75 is forced through line 77, provided with valve 78, by means of pump 79, into line 13. At least a part of the normal butane thus recycled through line 77 may, by judicious control of valves 80 and 81, be passed through line 82 into line 16, leading into reactor 18.

Vapors comprising isobutane are withdrawn overhead from fractionator 72 through line 83, provided with valve 84, as a final product, and passed to conventional condensing and recovery means.

Figure II of the drawing illustrates apparatus suitable for carrying out the process of the invention in modified form. The apparatus of Figure II differs from that of Figure I in that reaction chamber 18 is replaced by a reaction zone providing for countercurrent flow therethrough of catalyst and liquid material being treated. Parts of apparatus identical to those of Figure I are indicated with like reference characters. In Figure II, the butane stream, containing recovered catalyst components, emanating from extractor 15 through line 16, is passed into the lower part of the first of a plurality of reaction chambers 86, 87, and 88. Although three reaction chambers are shown in the drawing, a greater or lesser number may optionally be used. The butane stream is caused to flow serially and upwardly through reactors 86, 87, and 88. A flow of catalyst is passed serially and downwardly through reactors 88, 87, and 86 countercurrent to the flow of reactants. In this method of operation the more soluble component of the catalyst will tend to move with the flow of reactants. Thus, when utilizing the SbCl₃-AlCl₃ catalyst of the present illustrative example in the isomerization of butane, the SbCl₃ which is appreciably soluble, will tend to move in the direction of flow of the butane. The sludge, which is substantially insoluble in butane, will tend to move along with the catalyst countercurrent to the butane. By judicious control of the flows through reactors 86, 87, and 88, the sludge may be caused to accumulate in reactor 86, from the lower part of which it is continuously withdrawn and forced by means of pump 89, through line 41, to column 15. The reaction products containing catalyst are continuously withdrawn from the upper part of reactor 88 and passed through line 29 to vaporizer 30. Within vaporizer 30 a vapor fraction comprising isobutane is separated from a liquid fraction comprising catalyst as described above. The flow of reaction products through the rectifier 51 and the remainder of the system is that described above. Vaporizer 30, as described above, here also preferably functions as a catalyst accumulator and a supply of fluid catalyst is preferably maintained therein. Fluid catalyst is withdrawn from vaporizer 30 and forced by means of pump 32 through lines 33 and 35 to an intermediate part of reactor 88. Sufficient catalyst is bypassed through line 48, chamber 47 containing AlCl₃, and line 49, to replace the amount of AlCl₃ used up in the process. Reaction temperatures are maintained by heater 17, heating coil 38, and optionally by additional heating means, not shown in the drawing, within the reactors. When operating with a higher temperature in scrubber 15 than in reaction chamber 86, heater 17 may be replaced by suitable cooling means comprising, for example, a heat exchanger, enabling the reduction of the temperature of the hydrocarbon stream in line 16 to the desired reaction temperature.

By proper control of the rate of catalyst flow, the material passed from reactor 86 to column 15, through line 41, will consist at least predominantly of spent catalyst. On the other hand, substantially no sludge will pass through line 29 into evaporator-accumulator 30 to contaminate the catalyst accumulated therein. The method of introducing the recovered more soluble component of the catalyst into the charge inlet end of the reaction zone countercurrently to the catalyst flow enables the most advantageous redistribution of this component into the catalyst mass. The presence of the more soluble catalyst component in the entering charge avoids the difficulties which would arise by too extensive a migration of the more soluble catalyst component through the reaction zone in the direction of the hydrocarbon flow. This modified method of carrying out the invention provides a highly advantageous process wherein the catalyst is, to a substantial degree, self-regenerating within the reaction zone and wherein the catalyst composition is readily maintained within the limits required for optimum operating conditions. This modification of the invention thus provides a highly efficient process, permitting attainment of substantial catalyst economy and materially increased ease of operation.

Under certain conditions it may be desirable to maintain a more rapid flow of catalyst through reaction chambers 88, 87, and 86. Under such conditions the catalyst withdrawn from reactor 86 will be spent to a degree which will decrease with the rate of catalyst flow through the reactors. A line 91 controlled by valve 92 is therefore provided to permit recirculation of catalyst from reactor 86 to reactor 88. In this method of operation only a part of the catalyst withdrawn from reactor 86 is continuously passed to the extractor 15 for the removal of sludge therefrom.

Though not shown in the drawing, extractor 15, chamber 13, vaporizer 30, reactors 86, 87, 88, and other parts of apparatus through which catalyst melt is passed, are provided with suitable means, such as insulating material, to prevent the loss of heat therefrom by radiation.

Although a molten mixture of aluminum chloride and antimony chloride is chosen in the above illustrative description as a suitable catalyst for the isomerization of butane according to the process of the invention, it is to be understood that the invention is not limited to the use of this particular catalyst and other suitable fluid catalysts may be employed. Thus, suitable isomerization catalysts include molten salt mixtures comprising one or more aluminum halides, such as aluminum chloride and/or aluminum bromide, in admixture with one or more other halides such as, for example, a halide of Li, Na, K, As, Zr, Nb, Mn, Pd, Sn, Sb, Hf, Ta, Vn, Cb, W, Tl, Pb, Bi, Fe, Co, Ni, S, Se, or Te. A very suitable catalyst comprises a molten mixture of the halides, such as the chlorides of aluminum and antimony and a halide of at least one of the following: Na, K, Zn. Particularly effective catalysts comprise the aluminum halide and the other halides in the ratios of proportions corresponding to or approaching their eutectic mixtures.

The process of the invention is applicable generally to the catalytic isomerization of isomerizable saturated hydrocarbons. Thus, it may be advantageously employed for the isomerization of saturated hydrocarbons containing at least four, and preferably not more than nine, carbon atoms. While the process is particularly adapted for the isomerization of open chain or paraffin hydrocarbons, it can also be advantageously applied for the isomerization of methyl cyclopentane, dimethyl cyclopentane, methyl cyclohexane, and similar naphthenic hydrocarbons. The process is particularly advantageous for the isomerization of butane and/or pentane. These hydrocarbons may be obtained in large quantities as individual compounds in a relatively pure state. The hydrocarbon treated, however, need not necessarily be a pure individual hydrocarbon, but may be a mixture of one or more hydrocarbons. Thus, the invention provides a practical process for converting the normal butane and normal pentane contents of commercial hydrocarbon mixtures such as are obtained from natural gases, petroleum distillates, cracked distillates, etc., to their valuable branched chain isomers. Especially suitable mixtures of hydrocarbons are the so-called butane-butylene fractions and pentane-amylene fractions from which unsaturated hydrocarbons have been substantially removed. Treatment of such mixtures obtained, for instance, as by-products in the sulfuric acid alkylation of isoparaffins, results in materially increasing their contents of branched chain isomers and converting them to suitable raw materials for reuse in the alkylation process. Technical butane and pentane fractions such as those containing from 70% to 98% of the normal isomer and from 2% to 30% of the branched chain isomer may be conveniently treated in accordance with the process of the invention and their content of branched chain isomers materially increased without loss due to decomposition and side reactions. Other mixtures of saturated hydrocarbons such as straight-run gasoline, casinghead gasoline, etc., containing appreciable quantities of normal butane, normal pentane, cyclohexane, methyl cyclohexane, or lower-boiling nonbranched saturated hydrocarbons may be advantageously treated to produce products which are suitable for alkylation of olefines and have superior ignition characteristics. It is found that the greatest improvement in ignition characteristics is obtained when treating such hydrocarbon fractions boiling predominantly below 70° C.

The hydrocarbon or mixture of hydrocarbons treated is preferably substantially free of materials which are particularly prone to undergo side reactions such as degradation, polymerization, etc., under the reaction conditions. If desired, excessive quantities of olefines, diolefines, or other detrimental impurities which may be present in the hydrocarbon or hydrocarbon mixture to be treated may be removed by a suitable pretreatment such as by a mineral acid refining, hydrogenation, or the like. However, an important advantage of the process of the invention resides in the fact that column 15 functions as a charge pretreating zone wherein impurities such as unsaturated hydrocarbons are converted in the presence of the spent or partly spent catalyst to materials which are readily eliminated from the system with the sludge withdrawn through line 42. Thus, when butane containing 0.6% by weight of butylene was used as the charge to the extractor wherein spent $SbCl_3$–$AlCl_3$ catalyst was being extracted, the butane leaving the extractor was found to contain only 0.004% by weight of olefine indicating that a practically complete removal of the olefine had been effected.

The process of the invention is in no wise limited to the isomerization of hydrocarbons, but is applicable to a wide variety of processes wherein organic materials are treated with fluid catalysts comprising normally solid materials or liquids which are higher-boiling than the material being treated. Thus, the process of the invention is particularly applicable to the execution of such processes as alkylation, cracking, polymerization, reforming, desulfurizing, treating, etc., of hydrocarbons wherein the hydrocarbons are contacted with molten salt mixtures.

We claim as our invention:

1. An isomerization process which comprises contacting an isomerizable saturated hydrocarbon in the liquid phase with a fluid catalyst melt comprising a halide of antimony and a halide of aluminum at isomerizing conditions in a conversion zone, continuously withdrawing a portion of partly spent catalyst from the conversion zone, scrubbing said portion of partly spent catalyst in a scrubbing zone with the hydrocarbon to be isomerized, thereby effecting the separation of catalyst components comprising antimony halide by solution from spent catalyst components in the scrubbing zone, passing the hydrocarbon containing dissolved catalyst components comprising antimony halide from the scrubbing zone to the conversion zone, passing hydrocarbon reaction products in admixture with a portion of the remaining catalyst from the conversion zone to a vaporizing zone, separating a vapor fraction comprising hydrocarbon reaction products from a liquid fraction comprising fluid catalyst in the vaporizing zone, passing said liquid fraction from the vaporizing zone to the conversion zone, and condensing and recovering said hydrocarbon reaction products.

2. An isomerization process which comprises contacting isomerizable saturated hydrocarbons in the liquid phase with a fluid catalyst melt comprising antimony trichloride and aluminum chloride at isomerizing conditions in a conversion zone, continuously withdrawing a portion of partly spent catalyst from the conversion zone, scrubbing said portion of partly spent catalyst in a scrubbing zone with the hydrocarbons to be isomerized, thereby effecting the separation of catalyst components comprising antimony trichloride by solution from spent catalyst components in the scrubbing zone, passing hydrocarbons containing dissolved catalyst components comprising antimony trichloride from the scrubbing zone to the conversion zone, passing hydrocarbon reaction products in admixture with a portion of the remaining catalyst from the conversion zone to a vaporizing zone, separating a vapor fraction comprising hydrocarbon reaction products from a liquid fraction comprising fluid catalyst in the vaporizing zone, passing said liquid fraction from the vaporizing zone to the conversion zone, and condensing and recovering said hydrocarbon reaction products.

3. An isomerization process which comprises contacting an isomerizable saturated hydrocarbon in the liquid phase with a fluid catalyst melt comprising a molten salt mixture containing a Friedel-Crafts type catalyst at isomerizing conditions in a conversion zone, continuously withdrawing a portion of partly spent catalyst from the conversion zone, scrubbing said portion of partly spent catalyst in a scrubbing zone with the hydrocarbon to be isomerized, thereby effecting the separation of at least a part of the more soluble catalyst components from substantially insoluble spent catalyst components in the scrubbing zone, passing the hydrocarbon containing dissolved catalyst components from the scrubbing zone to the conversion zone, passing hydrocarbon reaction products in admixture with a portion of the remaining catalyst from the conversion zone to a vaporizing zone, separating a vapor fraction comprising hydrocarbon reaction products from a liquid fraction comprising fluid catalyst in the vaporizing zone, passing said liquid fraction from the vaporizing zone to the conversion zone, and condensing and recovering said hydrocarbon reaction products.

4. A process for treating hydrocarbon mixtures consisting essentially of saturated hydrocarbons comprising isomerizable straight chain paraffin hydrocarbons to increase the content of branched chain paraffin hydrocarbons in said hydrocarbon mixture which comprises contacting said hydrocarbon mixture in the liquid phase with a fluid catalyst melt comprising a molten salt mixture containing a halide of the Friedel-Crafts type at isomerizing conditions in a reaction zone, continuously withdrawing a portion of partly spent catalyst from the reaction zone, scrubbing said portion of partly spent catalyst in a scrubbing zone with the hydrocarbon mixture to be treated, thereby effecting the separation of at least a portion of the more soluble catalyst components from substantially insoluble spent catalyst components in the scrubbing zone, passing hydrocarbons comprising dissolved catalyst components from the scrubbing zone to the reaction zone, passing hydrocarbon reaction products in admixture with a portion of the remaining catalyst from the reaction zone to a vaporizing zone, separating a vapor fraction comprising hydrocarbon reaction products from a liquid fraction comprising fluid catalyst in the vaporizing zone, passing said liquid fraction from the vaporizing zone to the reaction zone, and condensing and recovering said hydrocarbon reaction products.

5. A process for isomerizing hydrocarbons which comprises contacting a saturated isomerizable hydrocarbon in the liquid phase with a fluid catalyst melt comprising antimony chloride and aluminum chloride at isomerizing conditions in a conversion zone, continuously withdrawing a portion of partly spent catalyst from the conversion zone, scrubbing said portion of partly spent catalyst in a scrubbing zone with the hydrocarbon to be isomerized, thereby effecting the separation of catalyst components comprising antimony chloride by solution from spent catalyst components in the scrubbing zone, and passing the hydrocarbon to be isomerized containing dissolved catalyst components comprising antimony chloride from the scrubbing zone to the conversion zone.

6. A process for isomerizing saturated hydrocarbons comprising normal and branched chain paraffin hydrocarbons having at least four carbon atoms to the molecule which comprises contacting the hydrocarbons in the liquid phase with a fluid catalyst melt comprising antimony trichloride and aluminum chloride at isomerizing conditions in a conversion zone, continuously withdrawing a portion of partly spent catalyst from the conversion zone, scrubbing said portion of partly spent catalyst in a scrubbing zone with hydrocarbons to be isomerized, thereby effecting the separation of catalyst components comprising antimony trichloride by solution from spent catalyst components in the scrubbing zone, and passing hydrocarbons containing dissolved catalyst components comprising antimony trichloride from the scrubbing zone to the conversion zone.

7. A process for isomerizing hydrocarbons which comprises contacting a saturated isomerizable hydrocarbon in the liquid phase with a fluid catalyst melt comprising a halide of antimony and a halide of aluminum at isomerizing conditions in a conversion zone, continuously withdrawing a portion of partly spent catalyst from the conversion zone, scrubbing said portion of partly spent catalyst in a scrubbing zone with the hydrocarbon to be isomerized, thereby effecting the separation of catalyst components comprising antimony halide by solution from spent catalyst components in the scrubbing zone, and passing the hydrocarbon containing dissolved catalyst components comprising antimony halide from the scrubbing zone to the conversion zone.

8. A process for isomerizing hydrocarbons which comprises contacting a saturated isomerizable hydrocarbon in the liquid phase with a fluid catalyst melt comprising a molten salt mixture containing a halide of the Friedel-Crafts type at isomerizing conditions in a conversion zone, continuously withdrawing a portion of partly spent catalyst from the conversion zone, scrubbing said portion of partly spent catalyst in a scrubbing zone with the hydrocarbon to be isomerized, thereby effecting the separation of at least a portion of the more soluble catalyst components from substantially insoluble spent catalyst components in the scrubbing zone, and passing the hydrocarbon to be isomerized containing dissolved catalyst components from the scrubbing zone to the conversion zone.

9. A process for treating hydrocarbon mixtures consisting essentially of saturated hydrocarbons comprising isomerizable straight chain paraffin hydrocarbons to increase the content of branched chain paraffin hydrocarbons in said hydrocarbon mixture which comprises contacting the hydrocarbon mixture in the liquid phase with a fluid catalyst melt comprising a molten salt mixture containing a halide of the Friedel-Crafts type at isomerizing conditions in a conversion zone, continuously withdrawing a portion of partly spent catalyst from the conversion zone, scrubbing said portion of partly spent catalyst in a scrubbing zone with the hydrocarbon mixture to be treated, thereby effecting the separation of at least a portion of the more soluble catalyst components from substantially insoluble spent catalyst components in the scrubbing zone, and passing hydrocarbons comprising dissolved catalyst components from the scrubbing zone to the conversion zone.

10. In a catalytic hydrocarbon conversion process wherein hydrocarbons are contacted at conversion conditions with a fluid catalyst melt comprising a molten salt mixture containing a halide of the Friedel-Crafts type, the steps which comprise continuously withdrawing a portion of partly spent catalyst from the conversion zone, scrubbing said portion of partly spent catalyst in a scrubbing zone with hydrocarbons to be converted, thereby effecting the separation of at least a portion of the more soluble catalyst components from substantially insoluble spent catalyst components in the scrubbing zone, and passing hydrocarbons containing dissolved catalyst components from the scrubbing zone to the conversion zone.

11. In a catalytic hydrocarbon conversion process wherein hydrocarbons are contacted at conversion conditions with a fluid catalyst melt comprising a molten salt mixture, components of which vary in their degree of solubility in said hydrocarbons, the steps which comprise continuously withdrawing a portion of partly spent catalyst from the conversion zone, scrubbing said portion of partly spent catalyst in a scrubbing zone with hydrocarbons to be converted, thereby effecting the separation of at least a portion of the more soluble catalyst components from substantially insoluble spent catalyst components in the scrubbing zone, and passing hydrocarbons containing dissolved catalyst components from the scrubbing zone to the conversion zone.

12. In a continuous catalytic isomerization process wherein isomerizable saturated hydrocarbons are passed in continuous stream in the liquid phase at isomerizing conditions through a conversion zone containing a fluid catalyst melt comprising a halide of antimony and a halide of aluminum and partially spent catalyst is removed from the conversion zone, the steps which comprise at least partly saturating said hydrocarbon stream with respect to antimony halide before passage of said hydrocarbon stream into the conversion zone, passing hydrocarbon reaction products comprising dissolved catalyst components from the conversion zone to a vaporizing zone, separating a vapor fraction comprising hydrocarbon reaction products from a liquid fraction comprising fluid catalyst in the vaporizing zone, adding said halide of aluminum to the separated liquid fraction from the vaporizing zone, passing said liquid fraction with added halide of aluminum to the conversion zone, and condensing and recovering said hydrocarbon reaction products.

13. In a continuous catalytic hydrocarbon conversion process wherein hydrocarbons are passed in continuous stream in the liquid phase at conversion conditions through a conversion zone containing a fluid catalyst melt comprising a molten salt mixture containing a halide of the Friedel-Crafts type and partially spent catalyst is removed from the conversion zone, the steps which comprise at least partly saturating said hydrocarbon stream with respect to the more soluble component in said catalyst melt before passage of said hydrocarbon stream into the conversion zone, passing hydrocarbon reaction products comprising dissolved catalyst components from the conversion zone to a vaporizing zone, separating a vapor fraction comprising hydrocarbon reaction products from a liquid fraction comprising fluid catalyst in the vaporizing zone, passing said liquid fraction from the vaporizing zone to the conversion zone, condensing and recovering said hydrocarbon reaction products and adding to the catalyst returned to the conversion zone a less soluble component of said catalyst melt.

SUMNER H. McALLISTER.
JOHN ANDERSON.
WILLIAM E. ROSS.